United States Patent
Beigi et al.

(10) Patent No.: US 6,684,186 B2
(45) Date of Patent: Jan. 27, 2004

(54) SPEAKER RECOGNITION USING A HIERARCHICAL SPEAKER MODEL TREE

(75) Inventors: Homayoon S. M. Beigi, Yorktown Heights, NY (US); Stephane H. Maes, Danbury, CT (US); Jeffrey S. Sorensen, Seymour, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/237,059

(22) Filed: Jan. 26, 1999

(65) Prior Publication Data

US 2003/0014250 A1 Jan. 16, 2003

(51) Int. Cl.[7] .................................................. G10L 17/00
(52) U.S. Cl. ..................................................... 704/246
(58) Field of Search ............................... 704/246–250, 704/255–257, 243–245

(56) References Cited

U.S. PATENT DOCUMENTS

| | | | |
|---|---|---|---|
| 3,936,805 A | | 2/1976 | Bringol et al. ............ 340/172.5 |
| 5,522,012 A | * | 5/1996 | Mammone et al. ......... 704/250 |
| 5,550,966 A | | 8/1996 | Drake et al. ................ 395/154 |
| 5,598,507 A | * | 1/1997 | Kimber et al. .............. 704/246 |
| 5,649,060 A | | 7/1997 | Ellozy et al. ............... 704/278 |
| 5,655,058 A | * | 8/1997 | Balasubramanian et al. ......................... 704/255 |
| 5,659,662 A | * | 8/1997 | Wilcox et al. ............... 704/245 |
| 5,857,169 A | * | 1/1999 | Seide ......................... 704/256 |
| 5,864,810 A | * | 1/1999 | Digalakis et al. ........... 704/255 |
| 6,006,184 A | * | 12/1999 | Yamada et al. ............. 704/246 |
| 6,073,096 A | * | 6/2000 | Gao et al. ................... 704/245 |
| 6,073,101 A | * | 6/2000 | Maes ......................... 704/275 |
| 6,108,628 A | * | 8/2000 | Komori et al. ............. 704/256 |
| 6,141,641 A | * | 10/2000 | Hwang et al. .............. 704/243 |
| 6,173,076 B1 | * | 1/2001 | Shinoda ..................... 704/244 |

OTHER PUBLICATIONS

IBM Technical Disclosure Bulletin, vol. 38, No. 01, Jan. 1995, 2 pages.

* cited by examiner

Primary Examiner—David D. Knepper
(74) Attorney, Agent, or Firm—F.Chau & Associates, LLP

(57) ABSTRACT

In an illustrative embodiment, a speaker model is generated for each of a number of speakers from which speech samples have been obtained. Each speaker model contains a collection of distributions of audio feature data derived from the speech sample of the associated speaker. A hierarchical speaker model tree is created by merging similar speaker models on a layer by layer basis. Each time two or more speaker models are merged, a corresponding parent speaker model is created in the next higher layer of the tree. The tree is useful in applications such as speaker verification and speaker identification.

21 Claims, 9 Drawing Sheets

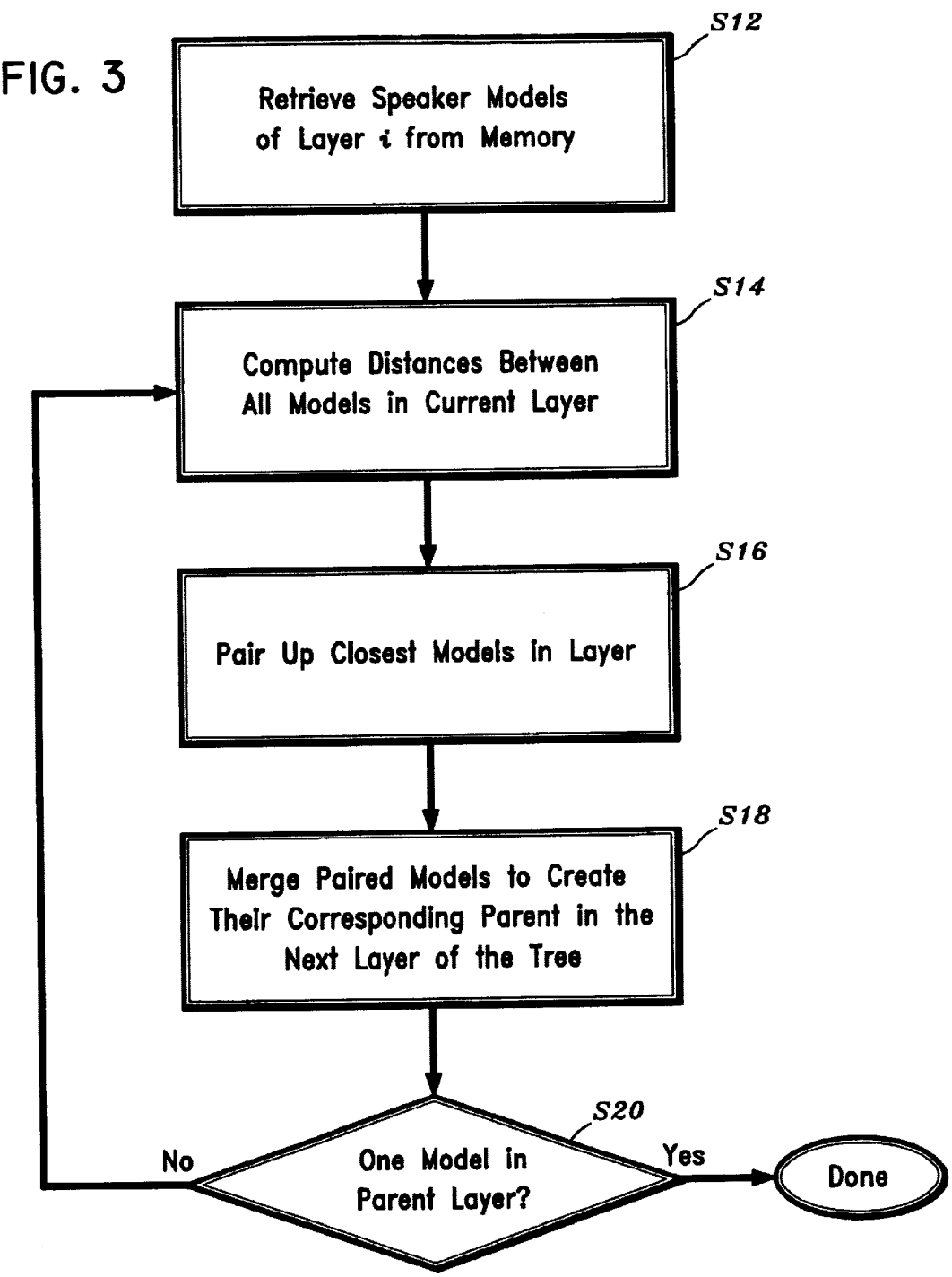

FIG. 4A

|  | Speaker Model B | | | | | |
|---|---|---|---|---|---|---|
|  | $B_1$ | $B_2$ | $B_3$ | ...... | $B_N$ | |
| $A_1$ | d11 | d12 | d13 | ...... | d1N | $W_1^A$ |
| $A_2$ | d21 | d22 | d23 | ...... | d2N | $W_2^A$ |
| $A_3$ | d31 | d32 | d33 | ...... | d3N | $W_3^A$ |
| . | . | . | . | . | . | . |
| . | . | . | . | . | . | . |
| . | . | . | . | . | . | . |
| $A_M$ | dM1 | dM2 | dM3 | ...... | dMN | $W_M^A$ |

Speaker Model A (left labels); Weighted Row Minima (right labels)

FIG. 4B

|  | Speaker Model B | | | | |
|---|---|---|---|---|---|
|  | $B_1$ | $B_2$ | $B_3$ | ...... | $B_N$ |
| $A_1$ | d11' | d12' | d13' | ...... | d1N' |
| $A_2$ | d21' | d22' | d23' | ...... | d2N' |
| $A_3$ | d31' | d32' | d33' | ...... | d3N' |
| . | . | . | . | . | . |
| . | . | . | . | . | . |
| . | . | . | . | . | . |
| $A_M$ | dM1' | dM2' | dM3' | ...... | dMN' |
|  | $W_1^B$ | $W_2^B$ | $W_3^B$ | ...... | $W_N^B$ |

Speaker Model A (left labels); Weighted Column Minima (bottom)

SPEAKER RECOGNITION USING A HIERARCHICAL SPEAKER MODEL TREE

BACKGROUND OF THE INVENTION

The present invention relates generally to the field of speaker recognition, which includes speaker verification and speaker identification.

The use of speaker verification systems for security purposes has been growing in recent years. In a conventional speaker verification system, speech samples of known speakers are obtained and used to develop some sort of speaker model for each speaker. Each speaker model typically contains clusters or distributions of audio feature data derived from the associated speech sample. In operation of a speaker verification system, a person (the claimant) wishing to, e.g., access certain data, enter a particular building, etc., claims to be a registered speaker who has previously submitted a speech sample to the system. The verification system prompts the claimant to speak a short phrase or sentence. The speech is recorded and analyzed to compare it to the stored speaker model with the claimed identification (ID). If the speech is within a predetermined distance (closeness) to the corresponding model, the speaker is verified.

Speaker identification systems are also enjoying considerable growth at the present time. These systems likewise develop and store speaker models for known speakers based on speech samples. Subsequently, to identify an unknown speaker, his speech is analyzed and compared to the stored models. If the speech closely matches one of the models, the speaker is positively identified. Among the many useful applications for such speaker identification systems is in the area of speech recognition. Some speech recognition systems achieve more accurate results by developing unique speech prototypes for each speaker registered with the system. The unique prototype is used to analyze only the speech of the corresponding person. Thus, when the speech recognition system is faced with the task of recognizing speech of a speaker who has not identified himself, such as in a conference situation, a speaker identification process can be carried out to determine the correct prototype for the recognition operation.

SUMMARY OF THE DISCLOSURE

The present disclosure relates to a method for generating a hierarchical speaker model tree. In an illustrative embodiment, a speaker model is generated for each of a number of speakers from which speech samples have been obtained. Each speaker model contains a collection of distributions of audio feature data derived from the speech sample of the associated speaker. The hierarchical speaker model tree is created by merging similar speaker models on a layer by layer basis. Each time two or more speaker models are merged, a corresponding parent speaker model is created in the next higher layer of the tree. The tree is useful in applications such as speaker verification and speaker identification.

A speaker verification method is disclosed in which a claimed ID from a claimant is received, where the claimed ID represents a speaker corresponding to a particular one of the speaker models. A cohort set of similar speaker models associated with the particular speaker model is established. Then, a speech sample from the claimant is received and a test speaker model is generated therefrom. The test model is compared to all the speaker models of the cohort set, and the claimant speaker is verified only if the particular speaker model is closest to the test model. False acceptance rates can be improved by computing one or more complementary speaker models and adding the complementary model(s) to the cohort set for comparison to the test model. In a cumulative complementary model (CCM) approach, one merged complementary model is generated from speaker models outside the original cohort set, and then added to the cohort set. In a graduated complementary model (GCM) approach, a complementary model is defined for each of a number of levels of the tree, with each complementary model being added to the cohort set.

BRIEF DESCRIPTION OF THE DRAWINGS

The following detailed description, given by way of example and not intended to limit the present invention solely thereto, will best be appreciated in conjunction with the accompanying drawings, in which like reference numerals denote like parts or elements, wherein:

FIG. 3 is a flow diagram of an exemplary software routine for merging speaker models in a tree-like fashion;

FIGS. 4A and 4B illustrate a technique for measuring distance between speaker models;

DETAILED DESCRIPTION OF CERTAIN PREFERRED EMBODIMENTS

Figure 1:
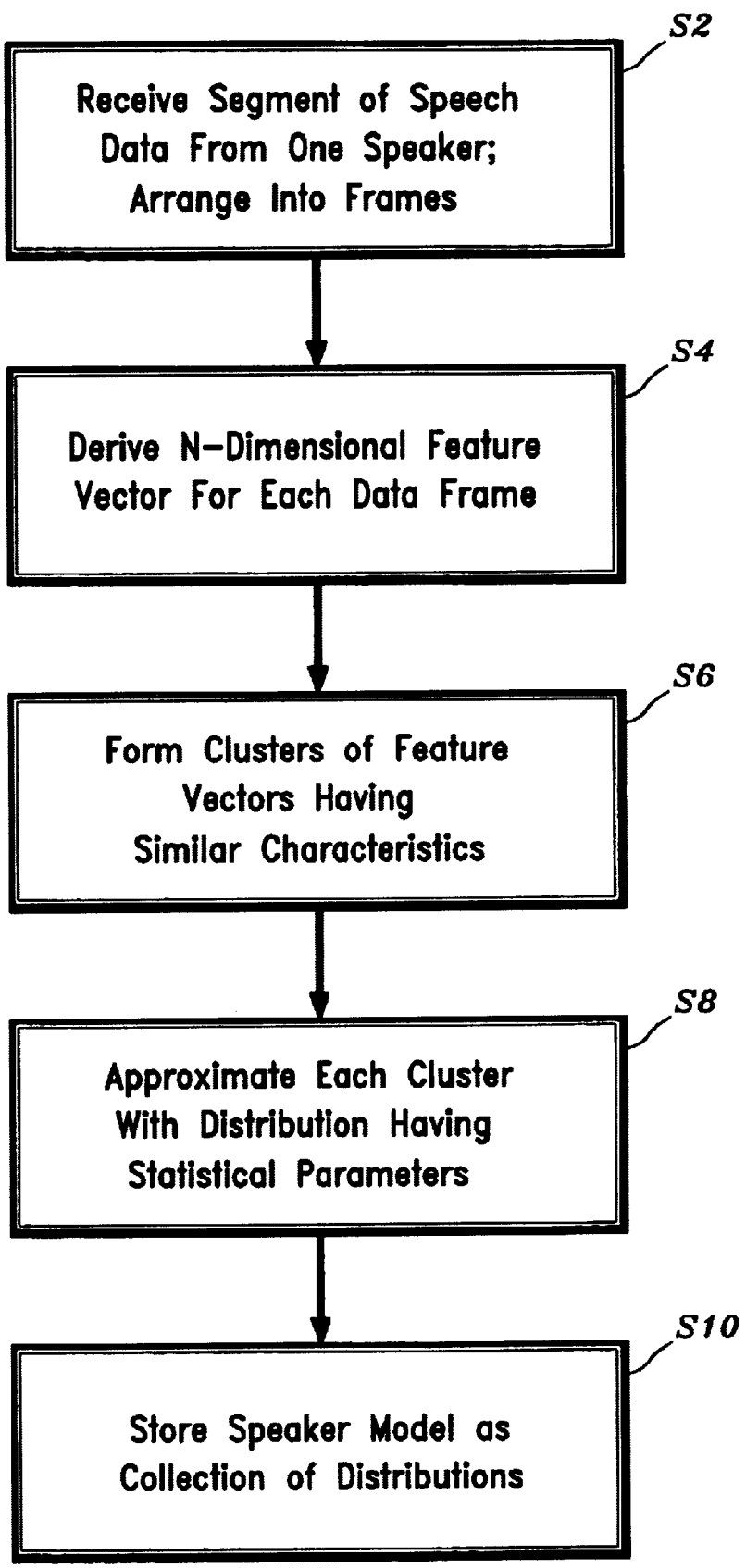
FIG. 1 is a flow diagram of an illustrative software routine for deriving a speaker model from a speech segment.

Referring to FIG. 1, a flow chart of a software routine for implementing part of an exemplary method of the present invention is shown. The purpose of this routine is to develop a speaker model for a particular speaker based on a short speech segment from that speaker. The speaker model may be merged with speaker models from similar speakers to form a speaker model tree in a hierarchical fashion as will be described in detail later.

At the outset, a segment of speech data from a single speaker is recorded and digitally stored by a suitable recording system. The speech segment, which may be several seconds in duration, is broken down into frames, typically 10–20 ms long (step S2). Next, spectral components corresponding to each frame are derived and an N-dimensional feature vector such as a Mel-Warped Cepstral feature vector is defined for each frame (step S4). The feature vector is composed of N quantized spectral components of generally equal spectral ranges. Methods for computing Mel-Warped Cepstral feature vectors are known in the art—see, e.g., L. Rabiner and B. H. Juang, *Fundamentals of Speech Recognition,* Prentice Hall Signal Processing Series, Alan V. Oppenheim, Series Ed., New Jersey, 1993, pp. 125–128. One advantage of the Mel-Warped Cepstral feature is that it attempts to remove pitch from the spectrum and warps the frequency resolution of the representation to more closely model that of the Melody scale. In any event, alternatives to Cepstral feature vectors include fast fourier transform (FFT) based feature vectors, feature vectors based on the first or second derivatives of Cepstral parameters, or linear predictive coefficients (LPC).

The way the spectral energy of each feature vector is apportioned among the spectral components is, of course, dependent upon the audio characteristics of the corresponding frame. Generally, feature vectors for audio frames with similar characteristics will likewise be similar. Hence, audio frames representing common phonemes of the same speaker will result in similar feature vectors for those frames.

With a feature vector thus established for each frame, the next step, S6, is to group feature vectors with similar characteristics into clusters. In general, similarity among feature vectors is determined by comparing, for a given feature vector, the energy level of each spectral component thereof to the energy levels of corresponding spectral components of other feature vectors. Feature vectors with small differences in energy levels averaged over the whole spectrum under consideration are grouped together to form part of a cluster. Merely by way of example, for a ten second audio segment which is divided into 500 frames (each 20 ms long), clusters of, e.g. 20–30 feature vectors may be formed, resulting in approximately 20 clusters for each audio segment. Each cluster is then approximated (step S8) by a Gaussian or other centralized distribution, which is stored in terms of its statistical parameters such as the mean vector, the covariance matrix and the number of counts (samples in the cluster). A speaker model is then defined and stored as a collection of the distributions corresponding to the respective clusters (step S10). Accordingly, once the statistical parameters are computed for the clusters, the feature vectors need not be carried around for subsequent distance calculations among clusters. Consequently, this approach is not as computationally intensive as one that uses the actual feature vectors to perform such comparisons.

One way to perform the cluster formation of step S6 is to employ a bottom-up clustering technique in which all the feature vectors are first arranged in a stream. A predetermined number of cluster centers in the stream are then randomly picked. Next, the K-Means algorithm as described in *Fundamentals of Speech Recognition,* supra, is run to come up with new cluster centers in an iterative fashion. Eventually, after the convergence of the K-Means algorithm, the predetermined number of N-dimensional vectors of means and their corresponding variances are available. The variance vector is also N-dimensional since a diagonal covariance matrix is assumed.

The routine of FIG. 1 is performed for a number of speech segments, each obtained from a different speaker, so as to develop a corresponding number of speaker models.

It is noted here that program code for the routine of FIG. 1, as well as for the routines illustrated in the other figures herein, can be stored on a portable program storage device such as a CD-ROM or digital versatile disk (DVD). The program storage device is read by a general or special purpose computer which runs the routine. The present invention may alternatively be implemented in hardware or a combination of hardware and software.

Figure 2:
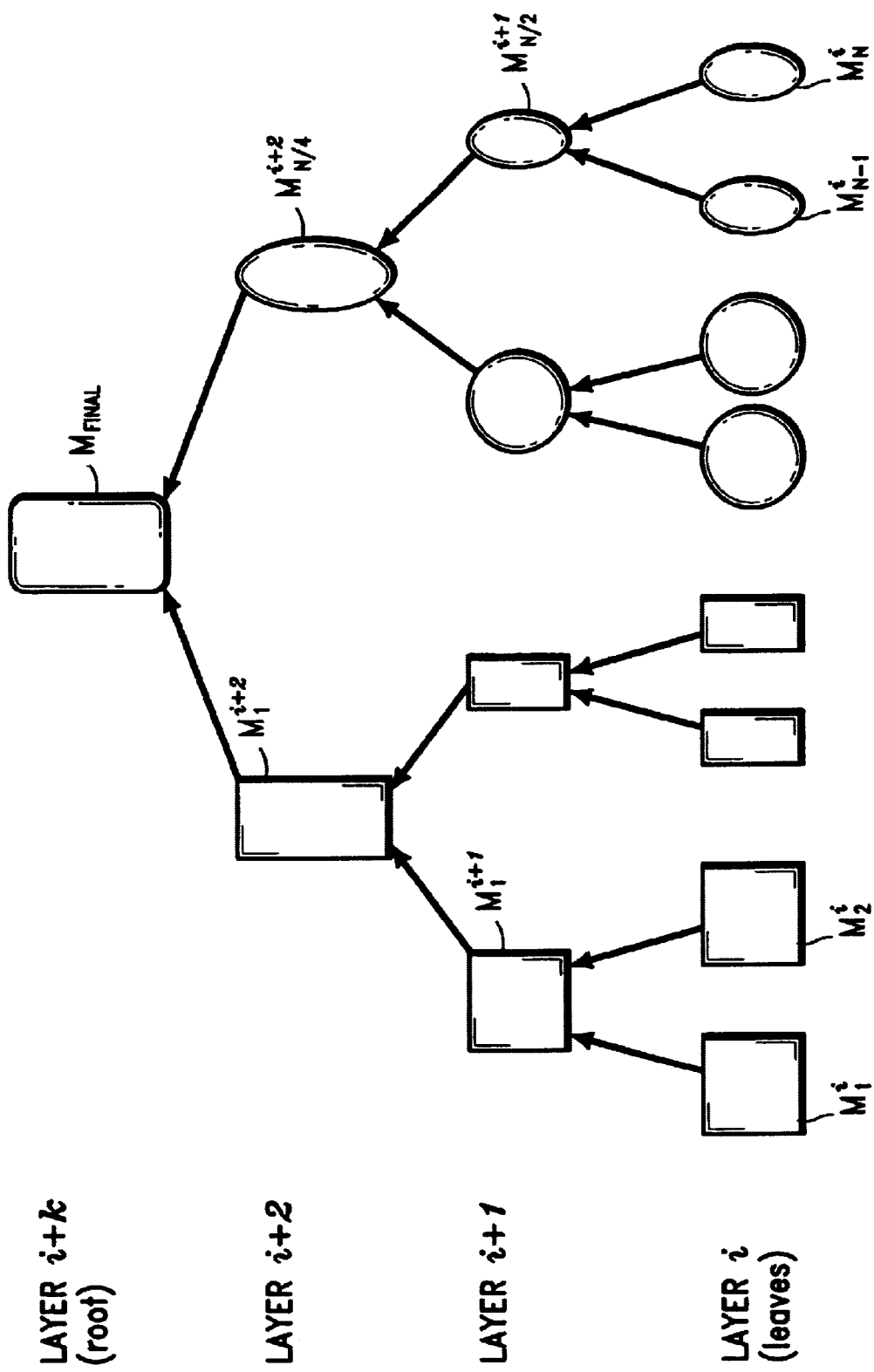
FIG. 2 is a diagram of a speaker model tree developed in accordance with the invention.

Referring now to FIG. 2, a speaker model tree building process in accordance with the invention is illustrated. The process starts with N base speaker models $M_1^i$ to $M_N^i$ in the bottommost layer i. These base models in the bottommost layer will be referred to as the leaves of the tree. Each model in layer i contains a collection of distributions derived from one speaker as described above in connection with FIG. 1.

A software routine is carried out to perform a distance measure among the speaker models in layer i to determine, for each speaker model, which of the other models is the most similar thereto (i.e., which has the shortest distance to the model under consideration). In this manner, pairs of similar speaker models are established. The speaker models of each pair are merged into a corresponding speaker model in the next higher layer i+1. As such, N/2 speaker models $M_1^{i+1}$ to $M_{N/2}^{i+1}$ are formed in layer i+1. These speaker models are then compared to each other to establish pairs, and then merged in the same manner to thereby define N/4 merged models in the next higher layer i+2. The tree building process continues until all the models are merged into a single speaker model $M_{FINAL}$ (root of the tree) in the top layer, i+k. The resulting tree structure, which consists of all the models in the various layers, can be used in a number of applications as will become apparent below.

The tree illustrated in FIG. 2 is a binary tree, in which two speaker models of a given layer are merged to create a corresponding parent. However, other types of tree structures may be formed in the alternative. In the general case, the invention is implemented with an n-ary structure in which n speaker models of each layer are merged to create a corresponding parent.

Referring now to FIG. 3, there is shown a flow diagram of an exemplary software routine for producing the speaker model tree of FIG. 2. The first step, S12, is to retrieve from memory all the speaker models $M_1^i$ to $M_N^1$ in the bottommost layer i. Next, the distances between all speaker models in the current layer (layer i, at this point) are computed (step S14). Based upon the distance measurements, the closest speaker models in the current layer are paired up (step S16). The paired models are merged in step S18 to create their corresponding parent in the next layer of the tree. If, in step S20, one model remains in the parent layer thus formed, the tree building process is complete; otherwise, the routine returns to S14 to continue the merging process for subsequent parent layers.

The computation of the distances between the speaker models in step S14 is preferably accomplished in accordance with the method described in copending U.S. Patent Application, Attorney Docket No. YO998-356 (8728-206), filed Jan. 26, 1999, entitled METHOD FOR MEASURING DISTANCE BETWEEN COLLECTIONS OF DISTRIBUTIONS, by the inventors herein. Briefly, this method of measuring the distance between two speaker models entails computing the minimum distances between individual distributions of one speaker model to those of the other speaker model. The total distance between speaker models is approximately a weighted sum of those minimum distances.

The distance measurement method is illustrated in more detail with reference to FIGS. 4A and 4B, wherein it is desired to measure the distance between speaker models A and B. Speaker model A consists of a collection of M Gaussian distributions $A_1$-$A_M$ derived from a speech segment of speaker A; speaker model B consists of N Gaussians $B_1$-$B_N$ derived from a speech segment of speaker B. A matrix of distances between the individual distributions of the two speaker models is computed. In FIG. 4A, the matrix consists of distances d11 to dMN measured from the distributions of model A to those in model B. For example, distance d21 is the distance from distribution $A_2$ to $B_1$. In FIG. 4B, the matrix is comprised of distances d11" to dMN" which are measured from the distributions in speaker model B to those in model A. Thus, distance d21" is the distance from distribution $B_1$ to $A_2$. (In some instances, the distances between two distributions in opposite directions may differ.) These "inter-distribution" distances of the matrix are computed using a conventional algorithm, e.g., the Euclidean, Mahalonobis or Kullback-Leibler algorithms.

As shown in FIG. 4A, an array of weighted row minima $W_1^A$ to $W_M^A$ is established by first finding the minimum distance in each row. This minimum distance is multiplied by the counts (number of samples) for the cluster corresponding to the A distribution to arrive at the weighted row minima $W_i^A$ for row i (i=1 to M). Thus, if the counts for distribution $A_1$ are designated $c_1^A$, then, $$W_i^A = (c_i^A)(diy) \quad (1)$$

where diy is the minimum distance in row i (distance between distributions $A_i$ and $B_y$).

Similarly, as shown in FIG. 4B, for each column j (j=1 to N), the minimum distance dxj" is computed (i.e., the distance from $B_j$ to $A_x$). Weighted column minimum $W_j^B$ for each column j is then determined from:

$$W_j^B = C_j^B(dxj") \quad (2)$$

where $C_j^B$ denotes the counts for the cluster corresponding to distribution $B_j$.

With weighted row minima $W_1^A$-$W_M^A$ and column minima $W_1^B$ to $W_N^B$ thus computed and stored in memory, the distance $D_{AB}$ between speaker models A and B is computed in accordance with eqn. (3):

$$D_{AB} = \frac{\sum_{i=1}^{M} W_i^A + \sum_{j=1}^{N} W_j^B}{\sum_{i=1}^{M} c_i^A + \sum_{j=1}^{N} c_j^B} \quad (3)$$

Figure 5:
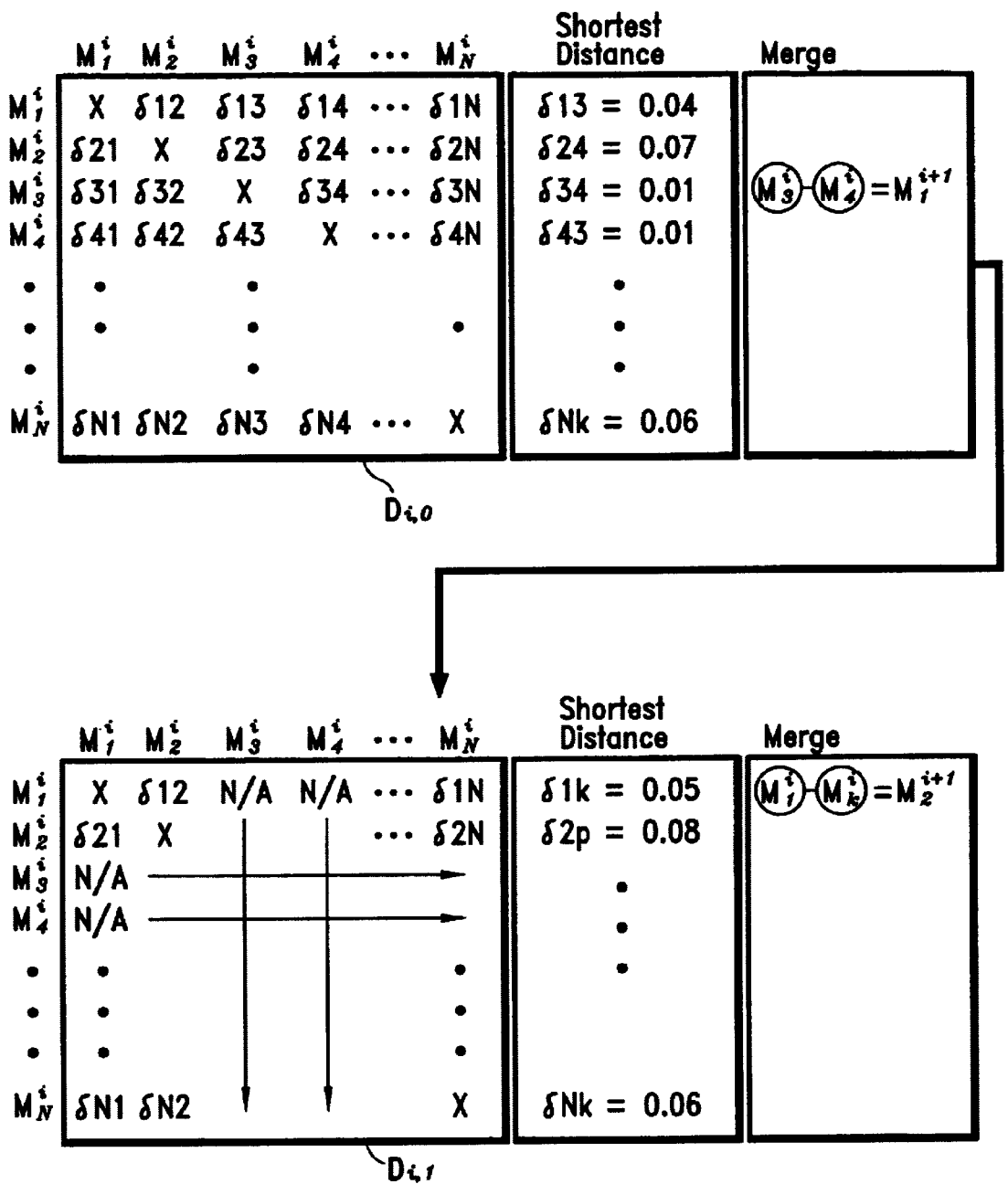
FIG. 5 illustrates a speaker model pairing method.

Returning momentarily to FIG. 3, the method step S16 of pairing up the closest speaker models in the tree layer under consideration can be performed in accordance with the approach illustrated in FIG. 5. A N×N distance matrix $D_{i,0}$ for the N speaker models in layer i is first established. The distance values therein represent the distances between speaker models, which may be computed in accordance with eqn. (3) or via some other inter-model distance measure. Preferably, the distance measure of eqn. (3) is used because this approach is orders of magnitude faster than a traditional Maximum Likelihood approach. In FIG. 5, distance δ21 is the distance from speaker model $M_2^i$ to model $M_1^i$; distance δ12 is the distance from model $M_1^i$ to model $M_2^i$; and so forth. To establish pairs of speaker models in row i to be merged into a corresponding parent in the next layer i+1, the distances within each row are compared to determine which is the shortest. The shortest distance overall is then used to establish one pair of speaker models. In the example shown, distance δ13 is the shortest in row 1; δ24 is the shortest in row 2; and so on. Since the shortest distance overall is between models $M_3^i$ and $M_4^i$, these models are merged to form the first merged model of the next layer, $M_1^{i+1}$. Additional pairs in layer i are then formed in the same manner, excluding models that have already been paired up. Thus, in the example, matrix $D_{i,1}$ is next considered, which is the same as $D_{i,0}$ except that models $M_3^i$ and $M_4^i$ are excluded. The shortest row distances are again determined to establish the next pair of models to be merged, in this case $M_1^i$ and $M_k^i$ to form parent model $M_2^{i+1}$. The process continues until all models in layer i are paired up. If the number N of speaker models in layer i is odd, the remaining model in that layer may be merged with the members of the next generation (level) in the tree.

As each level of the tree is created, the new models in that generation are treated as new speaker models containing their two children, and the pairing/merging process is continued layer by layer until one root model is reached at the top of the tree. Thus, using the technique of FIG. 5, after parent models $M_1^{i+1}$ to $M_{N/2}^{i+1}$ are derived, a new distance matrix $D_{i+1,0}$ (not shown) is formed containing the distances between the models of layer i+1, then distance matrix $D_{i+1,1}$, etc. The process is repeated until the top layer is reached.

Figure 6:
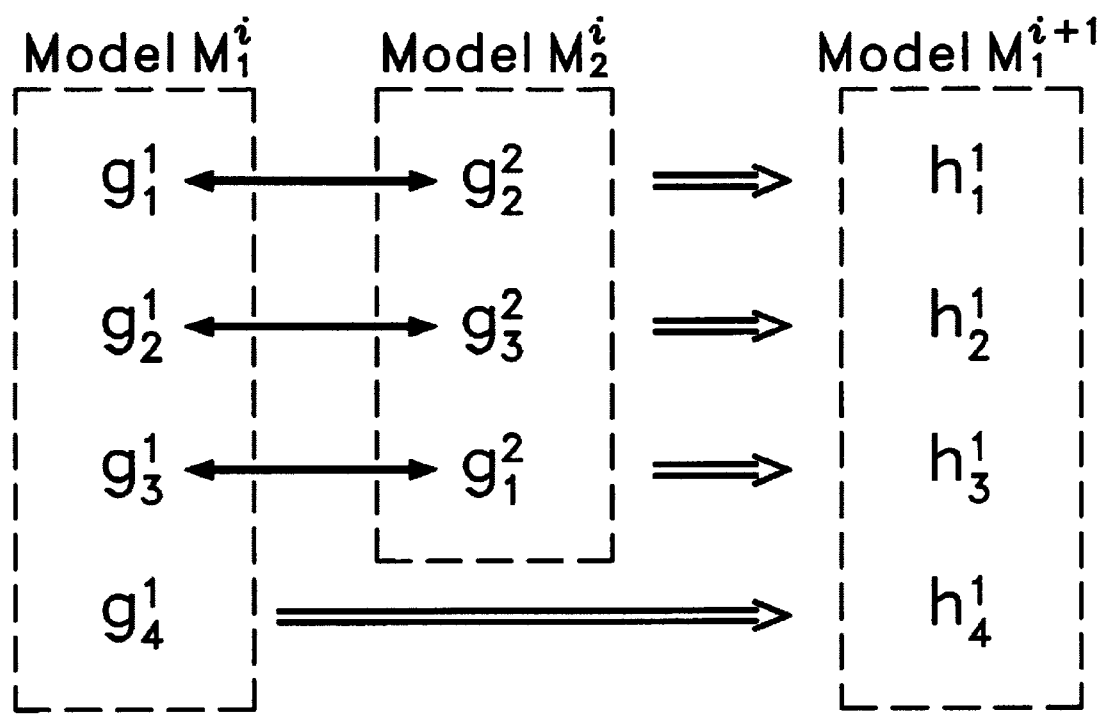
FIG. 6 illustrates a speaker model merging process.

FIG. 6 illustrates an exemplary approach to the speaker model merging operation. In the example, speaker model $M_1^i$ (of layer i) which contains four distributions $g_1^1$ to $g_4^1$, is to be merged with speaker model $M_2^i$ containing three distributions $g_1^2$ to $g_3^2$ (where the superscripts of the distributions denote the model association). The interdistribution distances between the two models are measured using a conventional distance measure to determine which are closest, whereby distribution pairs are established. The pairs are then merged to form a corresponding distribution in the parent model. For instance, in the example, distribution $g_1^1$ is determined to be closest to $g_2^2$, so these are merged to form distribution $h_1^1$ of the resulting parent model $M_1^{i+1}$ in layer i+1. Note that in this example the "children" $M_1^i$, $M_2^i$ contain a different number of distributions. In this case, the leftover distribution $g_4^1$ simply becomes the last distribution, $h_4^1$, of the parent model.

The merging of distribution pairs may be implemented by some type of averaging of the respective statistical parameters, e.g., averaging $\mu$, $\Sigma$ in the case of two Gaussian distributions. As an alternative, the merging can be accomplished by summing the actual feature data of the respective distributions. Either the first or second order sums of the feature data, $S_x$ and $S_x^2$, respectively, may be used. These parameters, along with the counts, would be used as an alternative set of parameters defining the Gaussian distributions of interest.

Having thus described an exemplary embodiment of a hierarchical speaker model tree building process in accordance with the present invention, several useful applications of the tree will now be presented.

Figure 7:
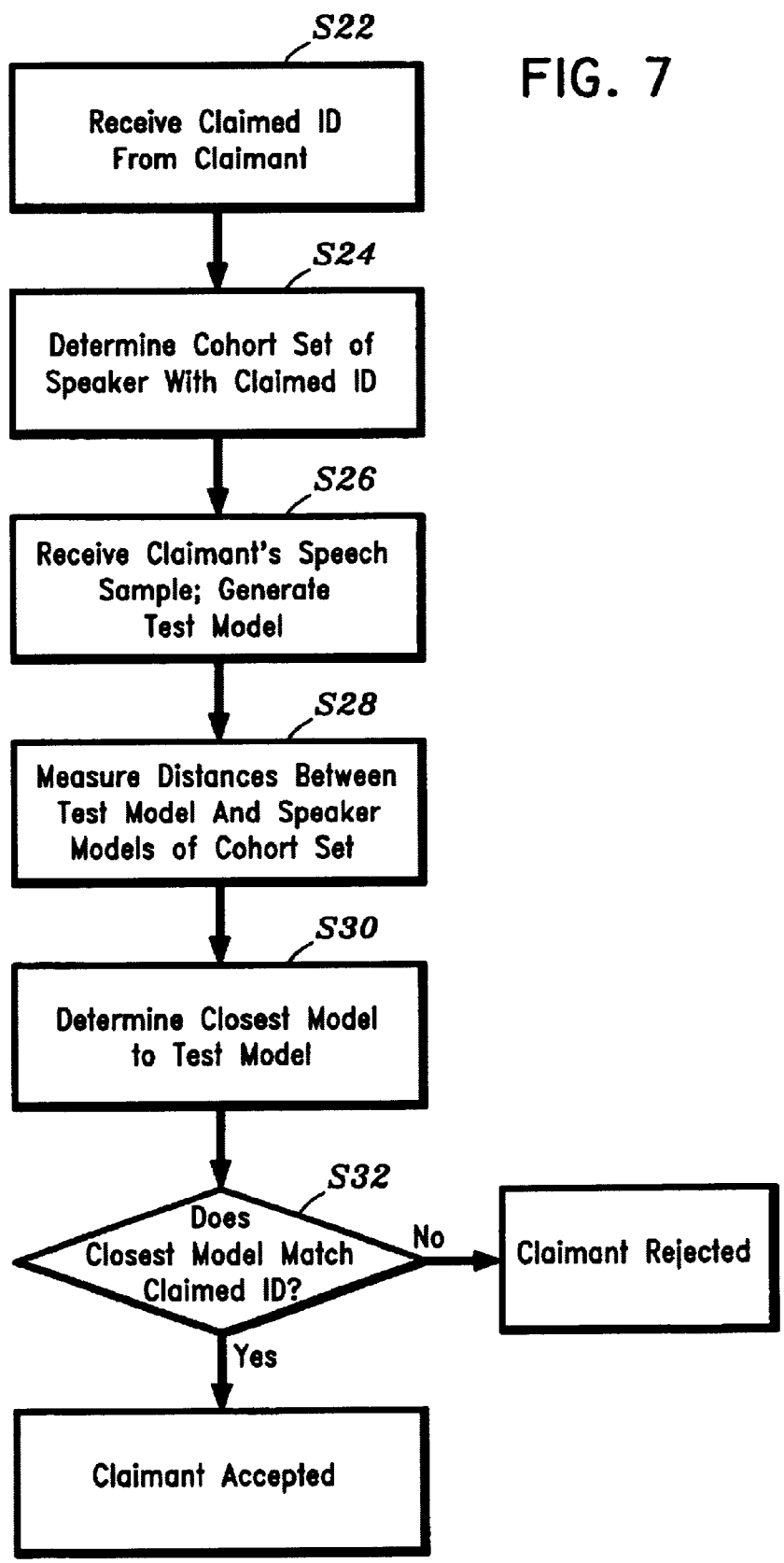
FIG. 7 is a flow diagram of a software routine for implementing a speaker verification operation.

With reference now to FIG. 7, a flow diagram of an illustrative software routine for implementing a speaker verification operation of the present invention is shown. The objective is to determine whether or not a person (the claimant) claiming to be a particular person who has previously submitted a speech sample to the system, is actually that person. The verification system is useful in security applications, for example. The routine utilizes a database (training data) of hierarchical speaker models, i.e., a speaker model tree, which was previously generated as described hereinabove.

The routine commences upon the reception of the claimed identification (ID) from the claimant (step S22) via a suitable user interface such as a computer terminal or a speech recognition system prompting the claimant to state his/her name. If the claimed ID corresponds to a person registered with the system, the routine then determines the cohort set of the speaker with the claimed ID (step S24). (If the claimed ID is not registered, the claimant would be rejected at this point.) The cohort set is determined from the speaker model tree (see FIG. 2) by first matching the label of the claimed ID with one of the leaf members; then traversing up the tree by as many layers as desired (based on the required size of the cohort); and finally, going back down from the resulting parent to all the leaves leading to that parent. The models in these leaves constitute the cohort, and correspond to those speakers who are closest to the claimed speaker.

Next, in step S26, the claimant is prompted to speak for several seconds. The speech is recorded and converted to feature vectors, which are used to generate a collection of feature vector distributions constituting a test model, typically in the same manner as for the leaf models as described above in reference to FIG. 1. The distances between the test model and the speaker models in the cohort set are then measured (step S28), preferably using eqn. (3). Optionally, the test model may also be compared to a background model, which is typically a reference speech model representing speech of an average person. Based on the distance measurements, the closest speaker model to the test model is extracted (step S30). If the extracted model corresponds to the claimed ID in step S32, then the claimant is accepted (verified); otherwise, he/she is rejected. A rejection also occurs if the background model is closest to the test model.

The above-described speaker verification technique is particularly useful when the number of registered speakers is very large. Since the routine need not compare the claimant's test model to each speaker model of the system, the processing task is simplified.

Figure 8:
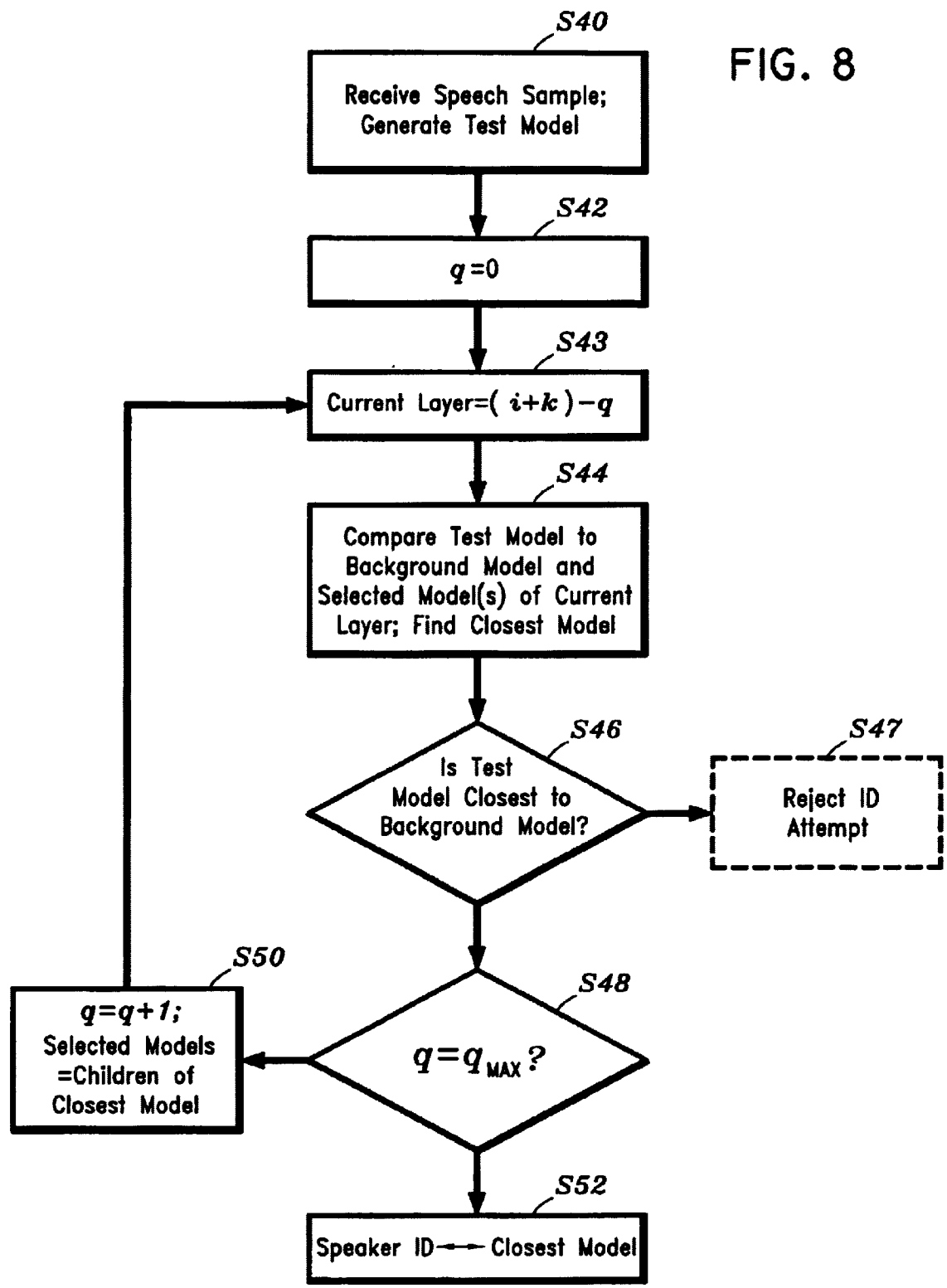
FIG. 8 is a flow diagram of a software routine for implementing a speaker identification operation.

Another application of the speaker model tree is speaker identification, where it is desired to identify an unknown speaker. The flow diagram of FIG. 8 illustrates a top down sweep approach to performing speaker identification using a pre-computed speaker model tree. Beginning with step S40, a speech sample of the unknown speaker is received and a test model containing a collection of distributions is generated therefrom in the same manner as described hereinabove. A variable q, which is used to identify levels of the tree, is set to zero in step 42. The current tree layer under consideration is set to (i+k)−q in step S43, where layer (i+k) denotes the top layer (root layer) of the tree. Next, in step S44 the test model is compared to both a background model and to selected model(s) of the current layer to determine which is closer. Since the root layer has only one model, $M_{FINAL}$, it becomes the initial selected model. If the closest model to the test model is the background model in step S46, the identification attempt may optionally be terminated in step S47. Otherwise, the routine proceeds to S48. If the variable q is less than a predetermined maximum $q_{MAX}$, then q is updated in S50, and the new selected models are set to the children of the closest model that was just determined in step S46. For instance, as seen in FIG. 2, the children of model $M_{FINAL}$ are both models in the next lower layer. As the process continues, the routine "travels down" the tree by continuing to select the closest speaker model in each layer, until the lowest layer is reached. At this point, $q=q_{MAX}$ and the speaker is identified as that speaker corresponding to the latest closest model, i.e., the closest model to the test model in the leaf layer. Accordingly, for this embodiment (which corresponds to a binary tree), a distance measure is made between the test model and only two speaker models in each layer. (In the general case of an n-ary tree, the test model is compared to n speaker models in each layer.) In the case of a large number of leaf members, the approach offers significant reduction in processing time as compared to the alternative approach of comparing the test model to every leaf member to determine which is closest.

Still another application for which the speaker model tree can be employed is speaker classification. For instance, any one of the leaf members can be classified into a group of four members by determining that leaf member's grandparent, or a group of eight members by determining that leaf member's great-grandparent, etc. In other words, each leaf member can be classified into a class of similar speakers with close distances to one another. There are a number of applications in which such classification is useful. In speech recognition, a few classes can be established, with a recognition prototype trained and stored for each class. When a new speaker comes in, the first few seconds of speech are used to find the class of speakers which is the closest to that speaker, and the corresponding prototype is used for speech recognition. Another example is speaker segmentation, in which it is desired to segment an audio stream containing many speakers into segments, each corresponding to a different speaker or audio type. See, e.g., H. Beigi et al., "*Speaker, Channel and Environmental Change Detection*", World Automation Congress, ISSCI98, Anchorage, Ala., May 18–22, 1998, which is incorporated herein by reference.

Returning now to the speaker verification technique of FIG. 7, two design issues to be considered are those of false acceptance and false rejection. If the claimant is an imposter and just happens to be closest to the claimed identity in the cohort which is picked, a false acceptance is reached. The probability of such an occurrence is 1/(cohort size). Two "complementary model" methods can be used to reduce the occurrences of false acceptances and false rejections as well. These are referred to herein as the Cumulative Complementary Model (CCM) method and the Graduated Complementary Model (GCM) method.

Figure 9:
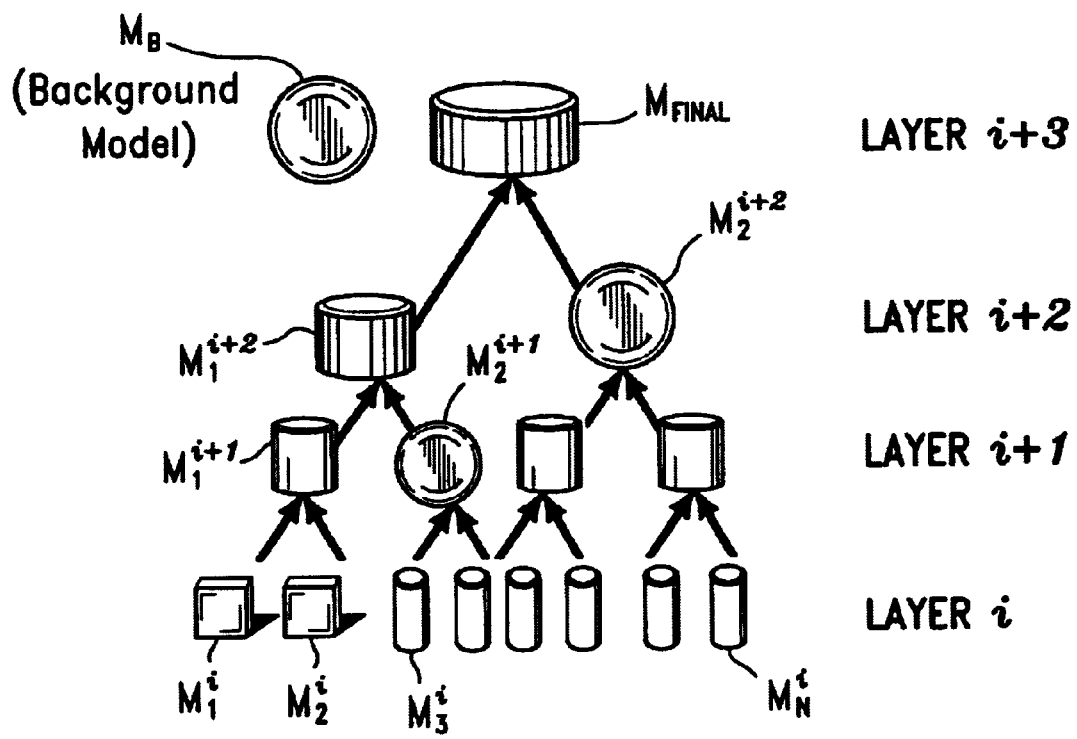
FIG. 9 is a diagram illustrating complementary speaker model generation.

Referring to FIG. 9, the principles underlying the CCM and GCM methods are illustrated. With either approach, a speaker model tree is first generated in the same manner as discussed above with reference to FIG. 2, and the speaker verification method of FIG. 7 is performed in a modified manner. The modification involves an expansion of the cohort set to which the test model of a claimant is compared in step S28 of FIG. 7. That is, the test model is compared to an additional model or models beyond the original speaker models of the cohort set.

With the CCM method, a single complementary model is created, which is used as a representation of all the models outside the original cohort set, both in the tree and outside the tree (given some background data). By way of example to illustrate the CCM method, as shown in FIG. 10, it is assumed that a claimant to be verified has indicated his/her identity as corresponding to the speaker model $M_1^i$. This model (the claimed model) is denoted in the figure as a cube. In this simple example, each cohort in the bottommost layer i has two leaf models in it. The cohort of model $M_1^i$ consists of models $M_1^i$ and $M_2^i$. With the approach described above in reference to FIG. 8, the claimant's test model is compared to these two models to determine which is closest; the claimant is verified if model $M_1^i$ is the closest, and rejected otherwise. With the CCM approach, the claimant's test model is also compared to a cumulative complementary model consisting of a merger of the siblings of the claimed model's ancestors. The inherent nature of the tree structure enables this computation to be a very fast one. The sibling(s) of each layer, denoted in the figure as a disk, are considered complementary to the claimed model's respective ancestors. In the example shown, the CCM consists of a merger of model $M_2^{i+1}$ (which is the sibling of parent $M_1^{i+1}$ in layer i+1) with model $M_2^{i+2}$ (which is the sibling of grandparent $M_1^{i+2}$ in layer i+2) and background model $M_B$, if one is available. If the distance between the test model and the CCM is closer than the distance between the test model and the claimed model $M_1^i$, the claimant is rejected. As a result, false acceptances are reduced. It is noted here that background model $M_B$ is a model generated based on speaker models of speakers that are not part of the speaker model tree.

In a more practical situation, the number of leaves (speaker models) in the bottommost layer i may be on the order of 1,000 and the number of leaves in each cohort set may be on the order of 10.

With the graduated complementary model (GCM) approach, complementary models are computed for each layer and added to the cohort set, rather than being merged together as a single CCM to be added. Thus, in the example of FIG. 9, where the claimed model is $M_1^i$, the original cohort set consisting of models $M_1^i$ and $M_2^i$ is augmented by three models, $M_2^{i+1}$, $M_2^{i+2}$ and $M_B$. If the verification (of steps S28 and S30) finds one of these complementary models to be the closest to the test speaker, the speaker is rejected.

The GCM method has an inherent confidence level associated with it. The higher the level (closer to the root) the more confident the rejection decision. Since no merges are necessary, the training is faster than CCM, but the testing is slower due to the larger cohort size.

Table 1 below presents false rejection and false acceptance results of an experiment conducted on 60 speakers out of a population of 184 speakers in a database. The tests were performed using three different methods: without a complementary model (no CM); with the CCM model; and with the GCM model. The data was collected using nine different microphones, including "Tie-Clip", "Hand-held" and "Far-Field" microphones. The training data lasts an average of 40 seconds. The test was performed using an average of six seconds of independent data (i.e., an average of six seconds of data from each claimant). 60 of the 184 speakers were randomly used for the testing. The results indicate that both the false acceptance and false rejection rates were significantly reduced using either of the CCM and GCM techniques. The false acceptance rate was reduced to zero using the GCM method.

TABLE 1

| Corpus | False Rejection | False Acceptance |
| --- | --- | --- |
| No CM | 4/60 = 6.66% | 11/60 = 18.33% |
| CCM | 5/60 = 8.33% | 5/60 = 8.33% |
| GCM | 5/60 = 8.33% | 0/60 = 0% |

While the present invention has been described above with reference to specific embodiments thereof, it is understood that one skilled in the art may make many modifications to the disclosed embodiments without departing from the spirit and scope of the invention as defined by the appended claims.

What is claimed is:

1. A method for speaker identification, comprising the steps of:
   generating, for each of a plurality of speakers, a speaker model containing a collection of distributions of audio feature data associated with that speaker;
   merging similar speaker models on a layer by layer basis so as to generate a hierarchical speaker model tree, wherein a lowest layer of the hierarchical speaker model tree comprises each generated speaker model; and
   performing speaker identification of an unknown speaker using the hierarchical speaker model tree to determine if the unknown speaker is one of the plurality of speakers, wherein the step of performing speaker identification comprises:
   i) receiving a new speech sample from the unknown speaker and generating a test speaker model therefrom;
   ii) comparing said test model with merged speaker models within a higher layer, i+j, of said tree to determine which of the merged speaker models is closest to said test model:
   iii) comparing said test model with children of said closest merged speaker model in a next lower layer, i+j−1, to determine which child is closest to said test model;
   repeating step (iii) on a layer by layer basis, including the lowest layer of the tree, whereby said unknown speaker is identified as the speaker corresponding to the closest speaker model in said lowest layer.

2. The method of claim 1 wherein said step of merging similar speaker models includes measuring distances between a first speaker model and all other speaker models within the same layer to determine which of the other speaker models is closest to the first speaker model, then merging the closest speaker model wit the first speaker model to create a corresponding parent speaker model in a next higher layer of the tree.

3. The method of claim 2, wherein distance between said first speaker model and a second speaker model within the same layer is measured by:
   determining, for each distribution of said first model, which distribution of said second model has the closest distance thereto, whereby a plurality of closest distances are obtained; and
   computing a final distance between said first and second models based at least upon said closest distances.

4. The method of claim 1 wherein each said distribution is a multi-dimensional Gaussian distribution.

5. The method of claim 1 wherein said step of merging similar models comprises:
   merging a first speaker model with a second speaker model which is close in distance to said first speaker model to form a parent speaker model, by establishing distribution pairs between the first and second speaker models and forming a merged distribution from each distribution pair, whereby the parent speaker model contains a plurality of merged distributions.

6. The method of claim 5 wherein each merged distribution is formed by avenging statistical parameters of the distributions of the respective distribution pair.

7. The method of claim 1, wherein said step of merging similar speaker models comprises determining sets of n speaker models in each layer having the closest distances to one another, and merging each set of n speaker models to form a corresponding parent speaker model on a layer by layer basis.

8. The method of claim 7, wherein n equals two, such that said tree has a binary structure.

9. The method of claim 7, further comprising the step of adding a leftover speaker model of a lower layer to a next higher layer.

10. A method for speaker verification, comprising the steps of:
    generating, for each of a plurality of registered speakers in a system, a speaker model containing a collection of distributions of audio feature data associated with that speaker;
    merging similar speaker models on a layer by layer basis so as to generate a hierarchical speaker model tree, wherein a lowest layer of the hierarchical speaker model tree are leaf member comprising the speaker models of said registered speakers; and
    performing speaker verification using the hierarchical speaker model tree to verify that a person is a registered speaker in the system, wherein the step of performing speaker verification comprising:

receiving a claimed identification from the person corresponding to a particular one of said speaker models of the lowest layer of the hierarchical speaker model tree;

determining a cohort set of similar speaker models associated with said particular speaker model using the hierarchical speaker model tree, wherein the step of determining a cohort set comprises the steps of matching the claimed identification with a leaf member of the hierarchical speaker model tree, traversing up the hierarchical speaker model tree from said leaf member to a parent node in a desired layer, and the traversing down the hierarchical speaker model tree from the parent node to all leaf members connected to the parent node, wherein all leaf members connected to the parent node comprise the cohort set;

receiving a new speech sample from the person and generating a test speaker model therefrom;

verifying that the person is a registered speaker if said particular speaker model is the closest model of said cohort set to said test model.

11. The method of claim 10, further comprising:

generating a single cumulative complementary model (COM) by merging complementary speaker models, said complementary speaker models being outside said cohort set; and rejecting said claimant speaker if said test model is closer in distance to said CCM than to said particular model.

12. The method of claim 11, wherein said complementary speaker models include a background model derived from speech data of speakers outside said tree.

13. The method of claim 10, further comprising:

generating a plurality of complementary speaker models, each being a sibling speaker model of an ancestor of said particular speaker model; and rejecting said claimant speaker if said test model is closer in distance to any one of said complementary speaker models than to said particular speaker model.

14. The method of claim 13, further comprising providing a background speaker model derived from speakers outside said tree, and rejecting said claimant speaker if said test model is closer in distance to said background speaker model than to said particular speaker model.

15. A program storage device readable by a machine, tangibly embodying a program of instructions executable by the machine to provide method steps for performing speaker verification, said method steps comprising:

generating, for each of a plurality of registered speakers in a system, a speaker model containing a collection of distributions of audio feature data associated with that speaker;

merging similar speaker models on a layer by layer basis so as to generate a hierarchical speaker model tree, wherein a lowest layer of the hierarchical speaker model tree are leaf members comprising the speaker models of said registered speakers; and performing speaker verification using the hierarchical speaker model tree to verify that a person is a registered speaker in the system, wherein the step of performing speaker verification comprises:

receiving a claimed identification from the person corresponding to a particular one of said speaker models of the lowest layer of the hierarchical speaker model tree;

determining a cohort set of similar speaker models associated with said particular speaker model using the hierarchical speaker model tree, wherein the step of determining a cohort set comprises the steps in matching the claimed identification with a leaf member of the hierarchical speaker model tree, traversing up the hierarchical speaker model tree from said leaf member to a parent node in a desired layer, and traversing down the hierarchical speaker model tree the parent node to all leaf members connected to the parent node, wherein all leaf members connected to the parent node comprise the cohort set;

receiving a new speech sample from the person and generating a test speaker model therefrom;

verifying that the person is a registered speaker if said particular speaker model is the closest model of said cohort act to said test model.

16. The program storage device of claim 15, wherein said method steps further comprise:

generating a single cumulative complementary model (CCM) by merging complementary speaker models, said complementary speaker models being outside said cohort set; and rejecting said claimant speaker if said test model is closer in distance to said CCM than to said particular model.

17. The program storage device of claim 15, wherein said method steps further comprise:

generating a plurality of complementary speaker models, each being a sibling speaker model of an ancestor of said particular speaker model; and rejecting said claimant speaker if said test model is closer in distance to any one of said complementary speaker models than to said particular speaker model.

18. The program storage device of claim 15, wherein said step of merging similar models comprises:

merging a first speaker model with a second speaker model which is close in distance to said first speaker model to form a parent speaker model, by establishing distribution pairs between the first and second speaker models and forming a merged distribution from each distribution pair, whereby the parent speaker model contains a plurality of merged distributions.

19. A program storage device readable by a machine, tangibly embodying a program of instructions executable by the machine, to perform method steps for performing speaker, the method steps comprising:

generating a speaker model for each of a plurality of speakers, wherein each speaker model comprises a collection of distributions of audio feature data associated with a speaker;

merging similar speaker models on a layer by layer basis so as to generate a hierarchical speaker model tree, wherein a lowest layer of the hierarchical speaker model tree comprises each generated speaker model; and performing speaker identification of an unknown speaker using the hierarchical speaker model tree to determine if the unknown speaker is one of the plurality of speakers, wherein the step of performing speaker identification comprises:

i) receiving a new speaker sample from the unknown speaker and generating a test speaker model therefrom;

ii) comparing said test model with merged speaker models within a higher layer, i+j, of said tree to determine which of the merged speaker models is closest to said test model;

iii) comparing said test model with children of said closest merged speaker model in a next lower layer, i+j−1, to determine which child is closest to said test model;

repeating step (iii) on a layer by layer basis, including the lowest layer of the tree, whereby said unknown speaker is identified as the speaker corresponding to the closest speaker model in said lowest layer.

20. The program storage device of claim 19, wherein the instructions for merging similar speaker models comprise instructions for measuring distances between a first speaker model and all other speaker models within the same layer to determine which of the other speaker models is closest to the first speaker model, then merging the closest speaker model with the first speaker model to create a corresponding parent speaker model in a next higher layer of the tree.

21. The program storage device of claim 19, wherein the instructions for merging similar models comprise instructions for merging a first speaker model with a second speaker model which is close in distance to said first speaker model to form a parent speaker model, by establishing distribution pairs between the first and second speaker models and forming a merged distribution from each distribution pair, whereby the parent speaker model contains a plurality of merged distributions.

* * * * *